United States Patent [19]
Bethurum

[11] Patent Number: 5,411,402
[45] Date of Patent: May 2, 1995

[54] CONNECTOR ASSEMBLY FOR IC CARD

[75] Inventor: Gary C. Bethurum, Laguna Niguel, Calif.

[73] Assignee: ITT Corporation, New York, N.Y.

[21] Appl. No.: 169,682

[22] Filed: Dec. 17, 1993

[51] Int. Cl.⁶ .......................................... H01R 13/627
[52] U.S. Cl. ...................................... 439/77; 439/493; 439/76; 439/352; 29/857
[58] Field of Search ................... 439/67, 76, 77, 492, 439/493, 352, 357; 29/857, 876, 884

[56] References Cited

U.S. PATENT DOCUMENTS

| | | |
|---|---|---|
| 1,677,734 | 7/1928 | Smith . |
| 3,399,374 | 8/1968 | Pauza et al. . |
| 3,656,090 | 4/1972 | McDonald et al. . |
| 3,692,966 | 9/1972 | Lancaster ........................ 200/51.1 |
| 3,737,833 | 6/1973 | Jerominek ........................ 439/493 X |
| 3,951,490 | 4/1976 | Devendorf ....................... 439/76 X |
| 3,953,098 | 4/1976 | Avery et al. . |
| 4,083,619 | 4/1978 | McCormick et al. ........... 439/352 X |
| 4,362,348 | 12/1982 | Stephenson et al. . |
| 4,548,455 | 10/1985 | Ezure . |
| 4,666,325 | 5/1987 | Vantouroux ..................... 403/13 |
| 4,682,828 | 7/1987 | Piper et al. ....................... 439/77 X |
| 4,810,206 | 3/1989 | Rosenfeld et al. ............... 439/325 |
| 4,946,395 | 8/1990 | Cope et al. ....................... 439/352 |
| 4,997,386 | 3/1991 | Kawachi et al. ................. 439/352 |
| 5,062,806 | 11/1991 | Ohno et al. ...................... 439/490 |
| 5,197,900 | 3/1993 | Ellis et al. ........................ 439/352 OR |

*Primary Examiner*—Larry I. Schwartz
*Assistant Examiner*—Daniel Wittels
*Attorney, Agent, or Firm*—Thomas L. Peterson

[57] ABSTRACT

A connector assembly is provided, which is compact and of light weight and which can lock to the rear of an IC (integrated circuit) card. The assembly includes a frame (54, FIG. 2) with a wide front portion (56) and a narrower rearward extension (90) that has a horizontal groove (92). A circuit board (74) has a slot (100), with opposite walls of the circuit board slot received in opposite groove parts of the frame rearward extension. A cable (20) whose front end is held to the rear of the board, has insulated wires (70) held in place against the board by tabs (120) projecting from the rearward extension. A pair of bendable latching arms (34, 36) project forwardly from the front of the frame for reception in a central aperture at the rear of the IC card. The frame has a central opening through which a locking pin (150) can slide to lock the arms in the IC card.

20 Claims, 7 Drawing Sheets

CONNECTOR ASSEMBLY FOR IC CARD

BACKGROUND OF THE INVENTION

One type of IC (integrated circuit) card has a connector at its rear end for connection to an input/output connector, or connector assembly. Such connector assembly may include a circuit board with a front end connected to a contact-holding frame, and a rear for coupling to a stripped end of a cable. The circuit board has a row of traces at its forward portion, with the tails of contacts soldered to the traces and with insulated wires of the cable extending along the circuit board and having bared ends soldered to the traces. It would be desirable if the circuit board could be held securely to the frame and if means were provided to hold down the cable wires to the circuit board to help in routing the wires to the different traces.

It is possible for the connector assembly, after being plugged into the rear of the IC card, to be pulled loose. A latching device would be desirable to latch to the rear of the IC device. It would be desirable if the latching device could be securely locked to the IC card, in a mechanism that could fit into the very thin space available for the connector assembly. Limited space is available because the connector assembly preferably has a thickness about the same as that of an IC card, which generally has a maximum thickness of 5 mm.

SUMMARY OF THE INVENTION

In accordance with one embodiment of the present invention, a connector assembly is provided which fits into a thin package, and which has a manually operable locking mechanism. The assembly includes a frame with a forward portion having at least one row of contact-holding passages, and a circuit board extending rearwardly from the forward portion of the frame, the circuit board having a rear coupled to a stripped cable. The frame includes a rearward extension extending rearwardly from the middle of the frame forward portion. The extension has a groove lying in a horizontal plane, and the circuit board has a slot to be received in the groove.

The rearward extension has tabs lying a small distance above the circuit board, to trap insulated wires of the cable between the tabs and circuit board to aid in routing the wires. The frame front portion has a pair of forwardly projecting latch arms, and the frame has a passage extending from its front end into the rearward extension for holding a locking pin that can prevent the latching arms from unlatching from the IC card. A manually operable handle with top and bottom parts at the top and bottom of the assembly, is slidably mounted on the rearward extension to move the locking pin. The assembly rearward of a flange on the frame front portion, is encapsulated by an overlayer, except for the top and bottom handle portions.

The novel features of the invention are set forth with particularity in the appended claims. The invention will be best understood from the following description when read in conjunction with the accompanying drawings.

DESCRIPTION OF THE PREFERRED EMBODIMENT

Figure 1:
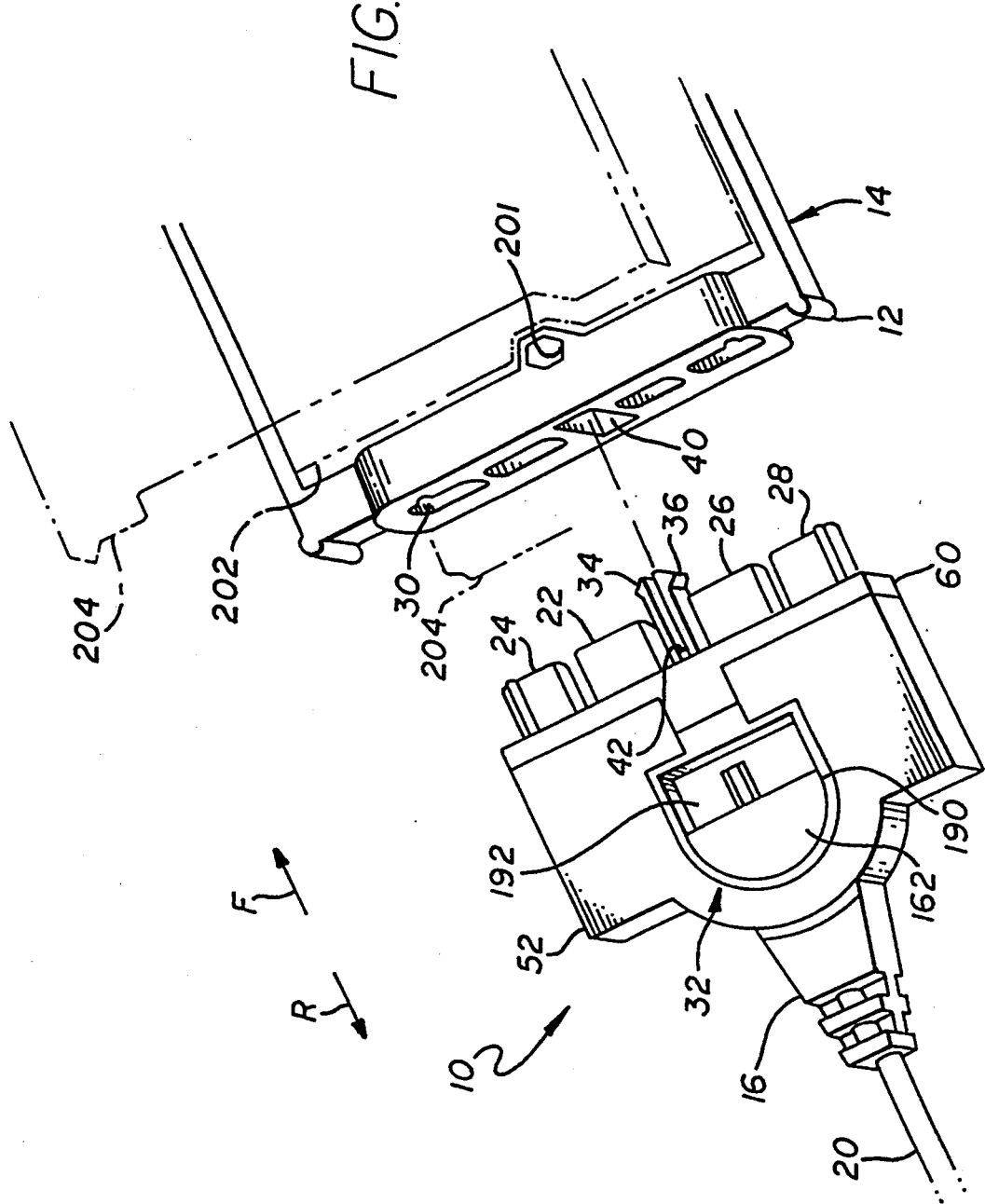
FIG. 1 is an exploded isometric view of a connector assembly and the rear portion of an IC card with which the connector assembly mates, constructed in accordance with the present invention.

FIG. 1 illustrates a connector assembly 10 which is designed to mate with the rear portion 12 of an IC (integrated circuit) card 14. The connector assembly has a rear 16 that connects to a cable 20, and has a front with plug parts 22–28 that are received in receptacle parts 30 of the IC card. The connector assembly has a latch mechanism 32 which includes a pair of arms 34, that can be received in a central aperture 40 at the rear of the IC card, to prevent the connector assembly from accidentally pulling out of the card. The latching mechanism includes a locking pin 42 which can slide to a position between front portions of the arms to prevent them from bending together to release from the IC card.

Figure 2:
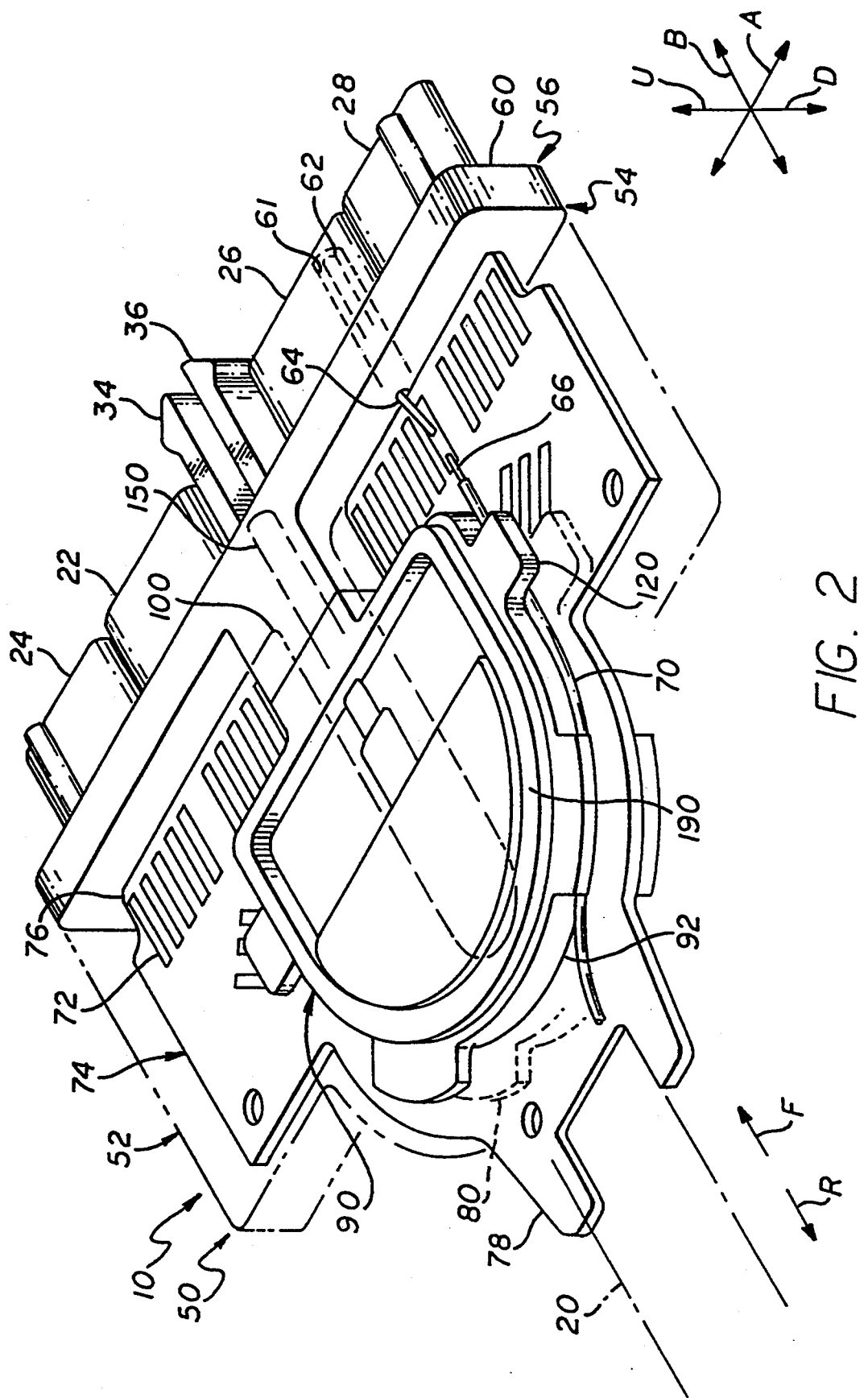
FIG. 2 is an isometric view of a connector subassembly of the connector assembly of FIG. 1, showing one wire of the cable.

As shown in FIG. 2, the connector assembly 10 includes a connector subassembly 50 that includes all parts of the assembly except for a molded overlayer 52. The subassembly includes a frame 54 with a front portion 56 that includes a flange 60 which is wide in a lateral directions A but which is narrow in vertical directions U, D and which is narrow in longitudinal directions B. The longitudinal directions B include forward and rearward directions F, R. The frame forward portion includes the plug parts 22–28 that project forwardly of the flange. The forward portion has a row of passages or contact-receiving openings 61 that each holds a contact 62. Each contact has a rearward end forming a tail 64, which must be connected to the bared front end 66 of an insulated cable wire 70. The connections are made by soldering the tail 64 and the wire front end 66 to any corresponding conductive trace 72 on a circuit board 74. The circuit board has a front end 76 that is connected to the frame front portion, and has a rear end 78 that is coupled to the stripped front end or portion 80 of the cable 20.

Figure 3:
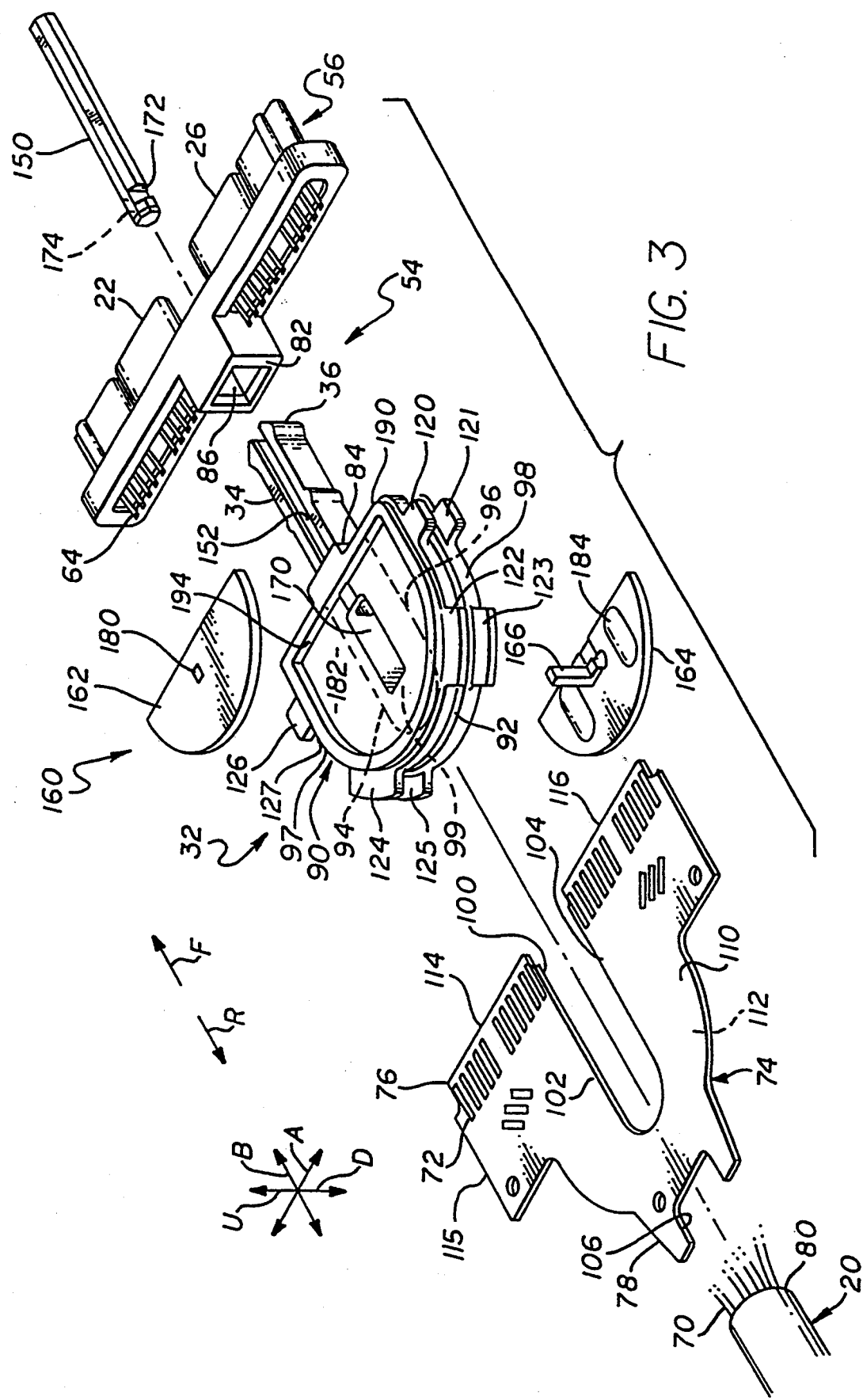
FIG. 3 is an exploded isometric view of the connector subassembly of FIG. 2.
Figure 4:
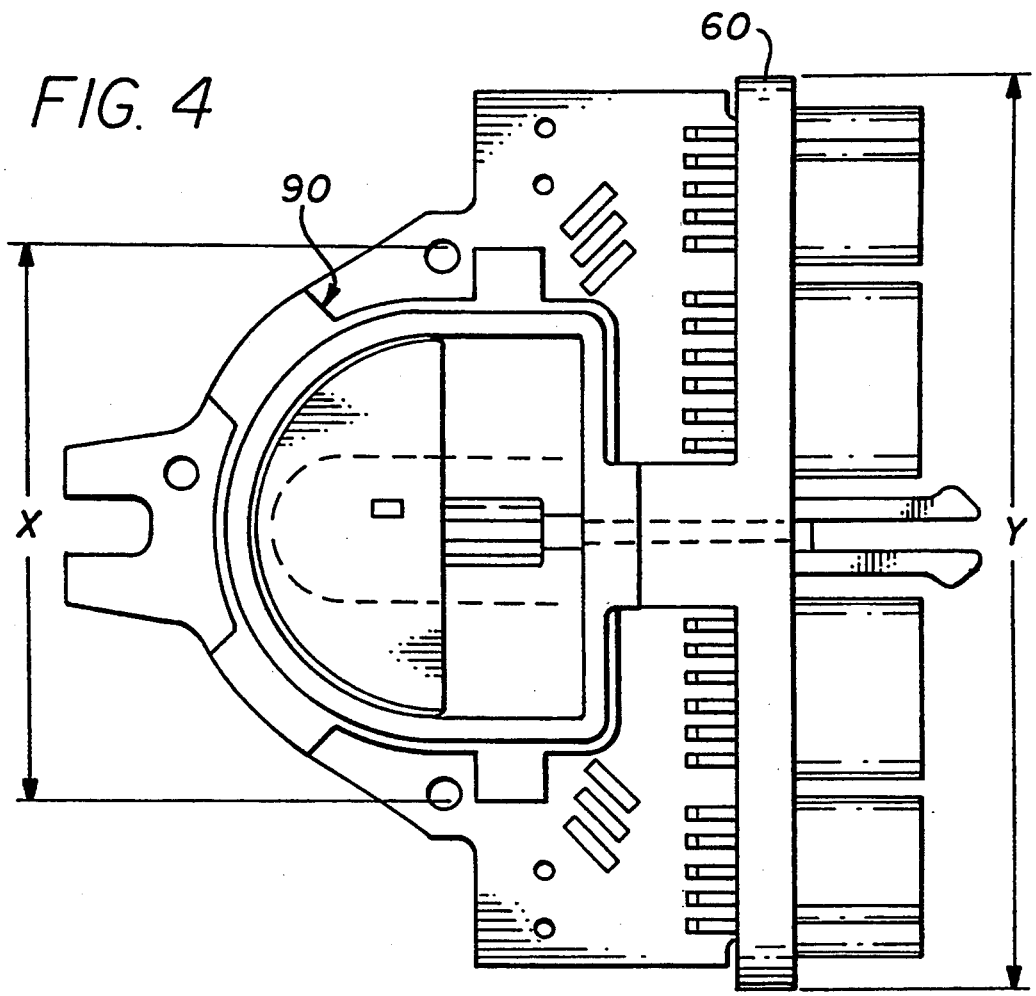
FIG. 4 is a plan view of the subassembly of FIG. 2, but without the cable.
Figure 5:
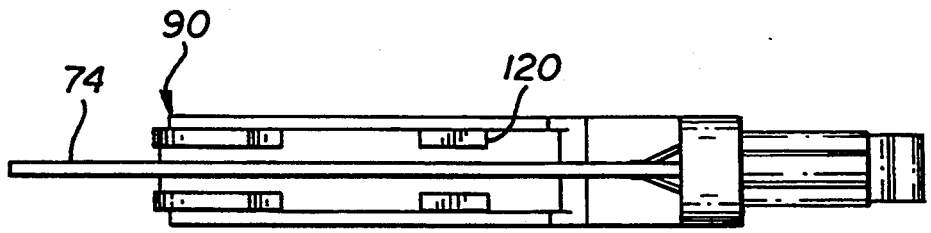
FIG. 5 is a side elevation view of the subassembly of FIG. 4.
Figure 6:
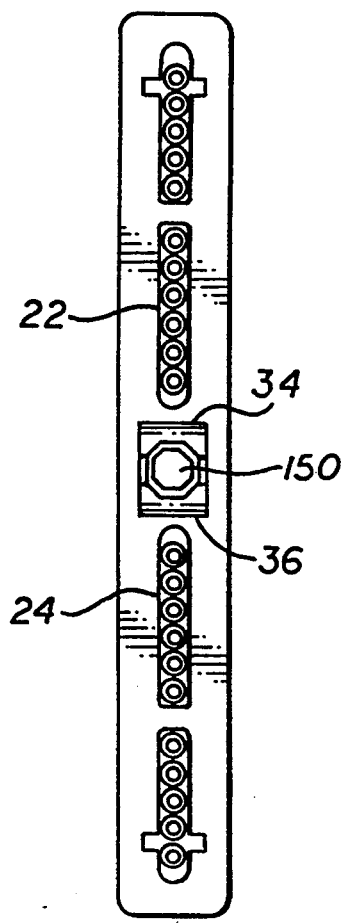
FIG. 6 is a front elevation view of the subassembly of FIG. 4.

The circuit board 74 is thin, having a thickness such as 0.55 mm in a connector having an overall thickness or height of about 5 mm. To securely hold the circuit board to the frame, applicant constructs the frame with a rearward extension 90. The rearward extension has a smaller lateral width X (FIG. 4) than that Y of the flange. As shown in FIG. 3, the rearward extension 90 is initially molded separately from the front portion 56, and these portions are joined at surfaces 82, 84 and kept aligned by the rear ends of the arms 34, 36 which project through an opening 86. The rearward extension has a groove 92 lying in a horizontal plane (in the directions A and B), the groove having laterally opposite groove sides 94, 96 at laterally opposite sides 97, 98 of the rearward extension. The rearward extension has a central part 99 that lines between the groove sides. The board 74 has a slot 100 extending rearwardly from the front end 76 of the board. The slot forms slot walls 102, 104 that are closely received in the groove sides 94, 96 when the board is slid in a forward direction F into the rearward extension 90 of the frame. This arrangement results in the frame 54 of the connector assembly securely holding the circuit board.

The circuit board has a rear end 78 with a slot 106 that receives the stripped front end 80 of the cable 20. The insulated wires 70 of the cable preferably extend along the upper and lower surfaces 110, 112 of the board, with applicant preferring to route most of the wires along the upper surface of the board. It may be noted that it is common for the cable to have many fewer insulated wires than the number of traces 72, so that wires are connected to only some of the traces. The circuit board has a front portion 115 with first and second front side portions 114, 116 with traces 72 positioned to engage contact tails 64 at plug parts such as 22, 26 that lie on opposite sides of a central passage 152.

Figure 7:
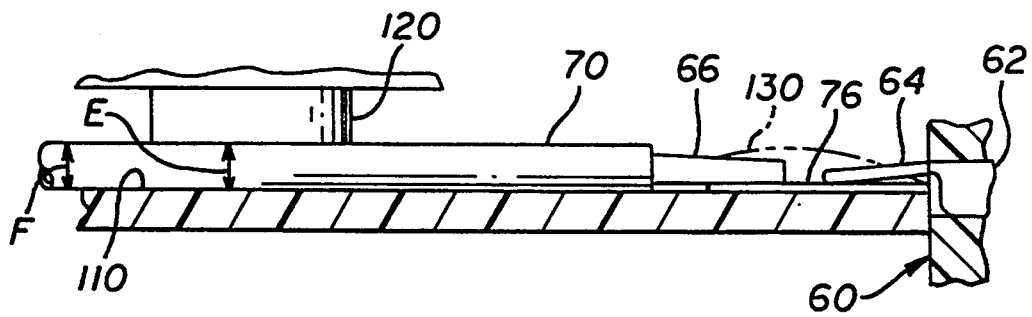
FIG. 7 is a side elevation view of a portion of the subassembly of FIG. 5, showing an insulated wire and contact tail connected together through a circuit board trace.

The frame rearward extension 90 has tabs 120-127 projecting in largely horizontal planes to lie over or under the board surfaces 110, 112. The tabs such as 120 are useful to hold down the cable wires 70. As shown in FIG. 7, each tab such as 120 is spaced from a corresponding board surface 110 by a distance E which is about the same as the diameter F of a cable wire 70. When the connector assembly is being fabricated, and the cable wires must be routed to corresponding traces 76, the persons assembling the connector slides the wires under the tabs such as 120 to hold the wires in position, with their bared forward ends 66 lying against corresponding traces 76. This helps to locate the wires and their bared ends for soldering, as indicated at 130, of the wire ends to the traces. After all of the wires are routed and their ends soldered to corresponding traces, with the contact tails 64 also soldered to corresponding traces, the connector subassembly is placed in a mold. The overlayer 52 (FIG. 2) is molded around all of the wires and most of the subassembly rearward of the flange 60 to hold the parts in place.

Figure 8:
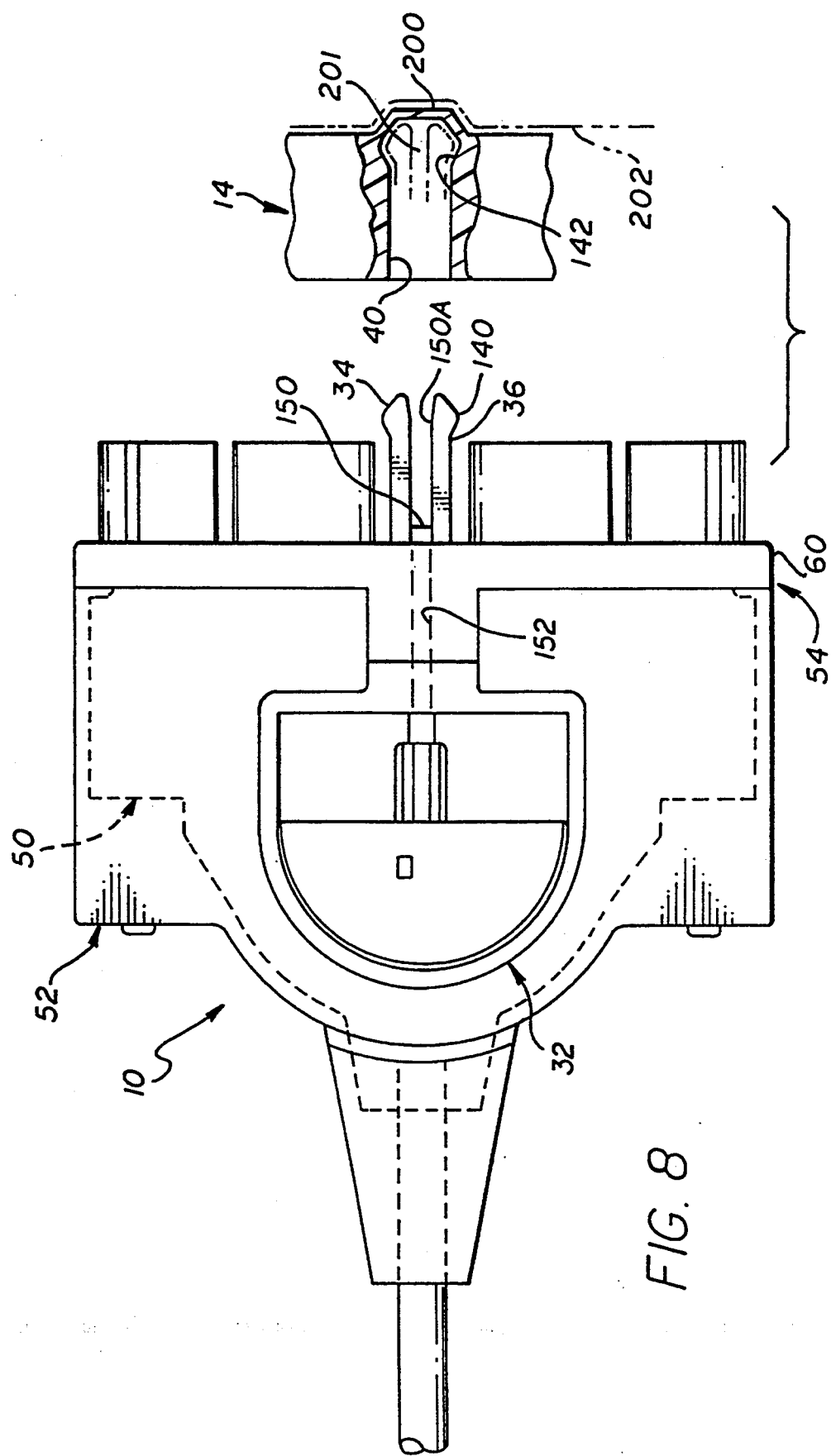
FIG. 8 is a plan view of the connector assembly, including the subassembly of FIG. 4 and an overlayer molded thereabout.
Figure 9:
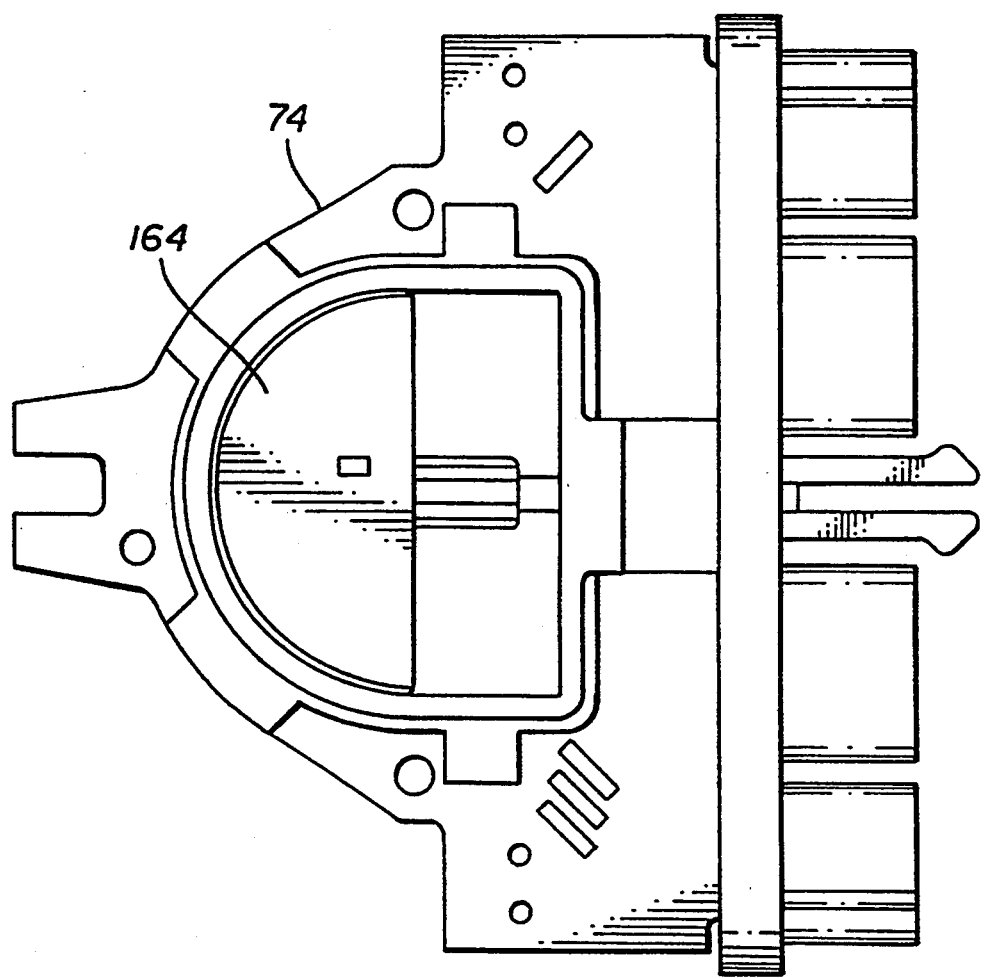
FIG. 9 is a bottom view of the connector subassembly of FIG. 4.

As shown in FIG. 8, the latch mechanism 32 includes the arms 34, 36 which are designed to be received in the central aperture 40 of the IC card 14. The arms are deflected together as they are received in the aperture, until lateral projections 140 at the front ends of the arms, which extend away from each other, lie against largely forwardly-facing shoulder 142 formed at the rear of the walls of the card central aperture 40. The arms resist rearward movement of the connector assembly 10, but, by themselves, do not lock the connector assembly to the IC card.

The latch assembly 32 includes a locking pin 150 that is longitudinally slidable within a central passage 152 formed in the frame 54 of the connector assembly. When the locking pin 150 slides forwardly to the position shown at 150A, it prevents the arms from moving together, and thereby locks the connector assembly to the IC card. It may be noted that basic latching mechanisms that include a pair of deflectable arms and a locking pin that can slide to a position between arms to prevent them from deflecting together, is known in the prior art, as described in U.S. Pat. No. 4,362,348. However, the latch mechanism 32 must be manually operated, and it can be difficult to provide a manually operated handle for moving a locking pin in the thin connector assembly which includes an injection molded overlay.

As shown in FIG. 3, the latch mechanism 32 includes a handle 160 with identical upper and lower handle parts 162, 164. Each handle part has a post 166 that projects through a slot 170 in the frame rearward extension 90. The post projects through a corresponding slot 172, 174 at the rear of the locking pin, with the end of the post snapping into a snap hole 180 of the opposite handle part. When the handle parts 162, 164 are slid forwardly, they slide the locking pin 150 forwardly to lock the connector assembly to the IC card, and when the handle is moved in the rearward direction R, it moves the locking pin rearwardly to allow the connector assembly to be released. The rearward extension 90 has smooth upper and lower surfaces 182 against which the handle parts slide, with each handle part having a pair of slider bearings 184 with rounded surfaces for low friction sliding along the rearward extension surfaces. The rearward extension has a barrier 190 at its top and bottom which surrounds the sliding surface 182 and which forms a recess 192 in which the handle parts move. The barrier 190 prevents the flow of molding material into the recesses 192 during molding of the overlayer. Thus, as shown in FIG. 1, the overlayer 52 surrounds all portions of the connector assembly rearward of the frame flange 60, except for the recesses 192 and the barriers 190. It can be seen that each handle is flat and of about the same thickness as the recess in which it lies, so substantially its entire thickness lies in its recess.

The presence of upper and lower handle parts 162, 164 facilitates operation of the latching mechanism. A person presses his thumb and forefinger respectively against the top and bottom handle parts, to squeeze them together while sliding them forward or rearward.

As shown in FIG. 8, the walls of the IC card central aperture 40 include a dust barrier 200 which closes the forward end 201 of the aperture. The dust barrier 200 lies forward of a circuit board 202 of the IC card, and prevents objects from being projected forwardly through the aperture 40, and onto the circuit board 202, where the objects could short circuit traces of the board. As shown in FIG. 1, the IC card includes upper and lower covers 204 which close the top and bottom of the rear 201 of the passage. The reason why the top and bottom of the passage 40 is open, is to facilitate molding of the passage, especially a recess at the rear that forms the shoulders 142.

While terms such as "top", "bottom" etc. have been used to aid in the description of the invention, the connector assembly can be used in any orientation with respect to gravity.

Thus, the invention provides a connector assembly that is especially useful for mating with an IC card, wherein the connector assembly is of rugged construction and can hold a compact manually operated latch mechanism. The connector assembly includes a frame with a forward portion having contact-holding passages, a circuit board extending rearward of the frame, and a cable with a stripped front end coupled to the rear of the circuit board. The frame includes a rearward extension extending rearward of the frame front portion. The rearward extension has a horizontal groove, and the circuit board has a slot to enable slot walls to be closely received in the groove. The rearward extension has tabs that are spaced slightly from the surfaces of the circuit board, to hold cable wires in place. A locking mechanism for moving a latching pin between latching arms that project forwardly at the front of the frame, includes handle parts lying at the top and bottom of the connector assembly. The connector assembly includes an overlayer which surrounds all of the connector assembly rearward of a forward flange, except for barrier walls and recesses therewithin in which the handle parts move.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A connector assembly which includes a frame having a forward portion with a lateral width and with a laterally extending row of passages, a board mounted to said frame and extending rearwardly of said frame forward portion, a cable having a stripped front portion lying at a rear portion of said board, said cable having a plurality of insulated wires extending at least partially forwardly along said board with said wires having wire front ends, and a plurality of contacts with forward portions lying in said passages and with rearward tails lying substantially on said board and connected to said wire front ends, characterized by:

said frame includes a rearward extension extending rearwardly from said frame forward portion, said rearward extension having a lateral width that is less than the width of said frame forward portion, said rearward extension having opposite sides, and said rearward extension having a groove with said groove having groove sides extending along said opposite sides of said rearward extension and exposed thereat;

said board having a front portion that is wider than said rearward extension, said board front portion having a part that is closely received in said groove sides of said frame rearward extension., with said board having opposite side portions projecting beyond opposite sides of said rearward extension.

2. The connector assembly described in claim 1 wherein:

said frame rearward extension has at least one largely horizontally-extending tab extending from one of said sides of said rearward extension and lying a distance above said board which is about the same as the diameters of each of a plurality of said wires, with at least one of said wires having a location trapped between said tab and said board.

3. The connector assembly described in claim 1 wherein:

said frame forward portion has walls forming a central passage extending in forward and rearward directions, and said frame includes a pair of forwardly-extending primarily parallel arms at opposite sides of said passage, with said arms being bendable toward and away from each other and having front ends forming lateral projections thereon;

a locking pin which lies in said passage between said arms and which is slidable in forward and rearward directions to respectively prevent and allow said arm front ends to deflect together;

a handle lying on said extension, coupled to said locking pin, and slidable forwardly and rearwardly along said extension, said handle having upper and lower parts that respectively lie at the top and bottom of said extension and that are each slidably mounted on said extension.

4. The connector assembly described in claim 1, including:

a latching mechanism which includes top and bottom handle parts that are connected together to slide forwardly and rearwardly and that lie respectively at the top and bottom of said frame rearward extension;

an overlayer of insulative plastic material molded around said board and around a portion of said cable extending rearward of said cable stripped front portion, but not over or under said handle top and bottom parts.

5. The connector assembly described in claim 1 wherein:

said frame forward portion has walls forming a central passage extending in forward and rearward directions, and said frame includes a pair of forwardly-extending primarily parallel arms which are bendable toward and away from each other and which have latching front ends;

said frame forward portion includes forwardly projection plug parts lying on laterally opposite sides of said central passage; and including an IC card which has a card housing and a circuit board within said housing, said housing including a rear end forming receptacle parts for receiving said plug parts and forming a central aperture between said receptacle parts for receiving said arms;

said card housing walls that form a central aperture, form a dust barrier at a forward end of said central aperture, said dust barrier isolating said circuit board from said central aperture.

6. A connector subassembly which has longitudinally spaced front and rear ends, said subassembly including a frame with a forward portion having a laterally elongated flange with a center and having first and second plug parts lying on laterally opposite sides of said center, with said plug parts each having a row of contact-holding passages with each passage extending longitudinally through one of said plug parts and through said flange for holding contacts with tail portions, said subassembly including a circuit board extending rearward of said flange with said circuit board having upper and lower surfaces and a front board portion with a row of conductive traces on said upper surface to which tails of said contacts can be soldered, said circuit board having a rear portion constructed to hold the front end of a stripped cable whose wires can run along said board with wire front ends soldered to said conductive traces, characterized by:

said frame of said subassembly includes a rearward extension which extends rearwardly of said flange and which has a lateral width that is less than the lateral width of said flange, said extension having opposite sides and said extension has a groove lying in a horizontal plane and of a thickness to closely receive said circuit board, said groove including groove sides extending along and exposed at said opposite sides of said rearward extension, and said rearward extension having a central part lying between said groove sides;

said circuit board has a slot extending rearwardly from said board front end, with walls of said board slot being closely received in said groove walls and lying on opposite sides of said central part, said circuit board having first and second side portions lying beyond opposite sides of said rearward extension and lying respectively behind said first and second plug parts, with each of said front portions having a row of traces corresponding to one of said row of passages.

a molded overlayer of plastic that lies around at least said circuit board.

7. The connector assembly described in claim 6 wherein:
said flange has a central opening, and said rearward extension includes a pair of arms with enlarged front ends, said arms projecting forwardly through and beyond said central opening of said flange.

8. The connector described in claim 6 including:
a locking pin which is longitudinally slidable between said arms, said pin having a rear portion with opposite sides and with a vertical slot at each of said sides;
a pair of handle parts one lying at the top of said rearward extension and the other at the bottom thereof, each handle part having a post which projects through one of said slots and which has a free end captured in the other handle, with said rearward extension having smooth surfaces slidably supporting said handles parts.

9. The connector assembly described in claim 6 wherein:
said rearward extension has cable-wire holdown tab lying over but spaced from opposite sides of said circuit board upper face to hold down cable wires to said board.

10. A method for constructing a connector assembly comprising:
molding a frame with a forward portion having a laterally extending flange and with a rearward extension that extends rearward of said flange and that has opposite sides, and that has a horizontal groove with groove portions which open to said laterally opposite sides of said rearward extension;
forming a circuit board with a forward end, and inserting said board forwardly so said circuit board is are received in said groove portions, until said board forward end lies substantially against said flange, with said step of forming said circuit board including forming said forward end with a greater width than said rearward extension so opposite sides of said board forward end lie on opposite sides of said rearward extension.

11. The method described in claim 10 wherein:
said rearward extension has laterally opposite sides, and including forming at least one tab on each of said sides;
said step of forming a circuit board includes forming a plurality of traces near said forward end of said board; and including
coupling a cable to a rear end of said circuit board and routing wires of said cable along said circuit board to said traces, with said tabs each spaced from said board by about the diameters of said wires, and with said routing including trapping a wire between each of said tabs and said board.

12. The method described in claim 10 including:
forming a latching mechanism on said frame, including leaving a depression on the top and bottom of said rearward extension with a barrier extending completely around each depression, and mounting a slidable handle part in each depression;
molding a plastic overlayer around said circuit board and said rearward extension, except not within said barriers.

13. A connector assembly which has a length in a forward-to-rearward longitudinal direction, a width in a perpendicular lateral direction, and a thickness in a direction perpendicular to said longitudinal and lateral directions, with said thickness being much less than said length or width, wherein said connector assembly includes a frame having a top and bottom and having a forward portion with a laterally extending row of contact passages, a cable having a plurality of wires with wire front ends, a plurality of contacts with portions lying in said passages and electrically connected to said wire front ends, and a latching mechanism mounted on said frame with said latching mechanism including a movable latch part for latching said frame to a mating connector, characterized by:
said latching mechanism includes top and bottom flat handles lying respectively on said top and bottom of said frame and connected to said movable latch part, said top and bottom handles each having a finger-engaging surface, including a first finger-engaging surface on which a person's thumb can rest and a second finger-engaging surface on which a person's finger opposed to his thumb can rest, to squeeze said handles to apply friction thereto to move them.

14. The connector assembly described in claim 13 wherein:
said top and bottom of said frame each has a recess, and each of said flat handles lies in a corresponding one of said recesses, with each handle being thin enough that substantially the entire thickness of each handles lies in the corresponding recess.

15. The connector described in claim 13 wherein:
said movable latch part comprises a rod with at least one slot, and each of said handles has a post that project through said at least one slot and that has a post end connected to the opposite handle.

16. The connector assembly described in claim 13 wherein:
said frame includes a pair of forwardly-extending primarily parallel arms, with said arms being bendable toward and away from each other and having front ends forming lateral projections thereon;
a locking pin which forms said movable latch part and which lies between said arms and which is slidable in forward and rearward directions to respectively prevent and allow said arm front ends to deflect together;
at least one of said handles is coupled to said locking pin and is slidable in said forwardly and rearwardly directions on said frame to move said locking pin.

17. A connector assembly which has a length in a forward-to-rearward longitudinal direction, a width in a perpendicular lateral direction, and a thickness in a direction perpendicular to said longitudinal and lateral directions, with said thickness being much less than said length or width, wherein said connector assembly includes a frame having a top and bottom and having a forward portion with a laterally extending row of contact-receiving openings, a cable having a plurality of wires with wire front ends, a plurality of contacts with portions lying in said openings and electrically connected to said wire front ends, and a latching mechanism mounted on said frame with said latching mechanism including a movable latch part for latching said frame to a mating connector, characterized by:

said frame forms a latch passage with said movable latch part lying in said passage;

said latching mechanism includes a top handle that is slidably mounted on said frame and a post that extends from said handle to said movable latch part so movement of said handle causes movement of said post and said movable latch part.

18. The connector assembly described in claim 17 wherein:

said passage extends in forward and rearward directions, and said frame includes a pair of forwardly-extending primarily parallel arms with a space between said arms forming said passage, with said arms being bendable toward and away from each other and having front ends forming lateral projections thereon;

said movable latch part comprises a locking pin which forms said movable latch part and which lies between said arms and which is slidable in forward and rearward directions to respectively prevent and allow said arm front ends to deflect together;

said handle is coupled to said locking pin and is slidable in said forwardly and rearwardly directions on said frame.

19. The connector assembly described in claim 17 wherein:

said top of said frame has a recess, and said flat handle lies in a said depression and is thin enough that substantially the entire thickness of said handle lies in said recess.

20. The connector assembly described in claim 17 wherein:

said latching mechanism includes a flat bottom handle which is slidable mounted on said frame, said top and bottom handles having surfaces on which a person's thumb can rest and on which a person's finger opposed to his thumb can rest, to squeeze said handles to apply friction thereto to move the mechanism.

* * * * *